(12) United States Patent
Liu et al.

(10) Patent No.: US 11,205,895 B2
(45) Date of Patent: Dec. 21, 2021

(54) POWER LOAD FORECASTING METHOD IN MULTI-ENERGY COUPLING MODE

(71) Applicant: NORTH CHINA ELECTRIC POWER UNIVERSITY, Beijing (CN)

(72) Inventors: Dunnan Liu, Beijing (CN); Lingxiang Wang, Beijing (CN); Heping Jia, Beijing (CN); Guangyu Qin, Beijing (CN); Mingguang Liu, Beijing (CN)

( * ) Notice: Subject to any disclaimer, the term of this patent is extended or adjusted under 35 U.S.C. 154(b) by 0 days.

(21) Appl. No.: 16/913,580

(22) Filed: Jun. 26, 2020

(65) Prior Publication Data

US 2021/0203159 A1    Jul. 1, 2021

(30) Foreign Application Priority Data

Dec. 27, 2019  (CN) .......................... 201911374596.0

(51) Int. Cl.
  *G05B 19/042*  (2006.01)
  *H02J 3/00*  (2006.01)

(52) U.S. Cl.
  CPC ............ *H02J 3/003* (2020.01); *G05B 19/042* (2013.01); *G05B 2219/2639* (2013.01); *H02J 2203/20* (2020.01)

(58) Field of Classification Search
  CPC .... H02J 3/003; H02J 2203/20; G05B 19/042; G05B 2219/2639
  See application file for complete search history.

(56) References Cited

U.S. PATENT DOCUMENTS

| | | | |
|---|---|---|---|
| 8,406,935 B2 | 3/2013 | Ko et al. | |
| 2004/0260489 A1* | 12/2004 | Mansingh | G06Q 50/06 702/60 |
| 2010/0082172 A1* | 4/2010 | Ko | G06Q 30/02 700/291 |
| 2012/0303300 A1 | 11/2012 | McDonald et al. | |
| 2017/0250539 A1* | 8/2017 | Feng | H02J 3/383 |
| 2018/0287382 A1 | 10/2018 | Genc et al. | |

FOREIGN PATENT DOCUMENTS

| CN | 109523053 A | 3/2019 |
|---|---|---|
| CN | 110688622 A | 1/2020 |

* cited by examiner

*Primary Examiner* — Gary Collins

(57) ABSTRACT

The present invention relates to a load forecasting method based on a multi-energy coupling scene, which comprises the following steps: step 1, establishing a multilevel indicator system of key influencing factors of load demand in a multi-energy mode; step 2, obtaining key influencing factors influencing the total load demand and the total supply of the multi-energy coupling load; step 3, normalizing the data of the key influencing factors extracted in step 2, and initializing population characteristic parameters of adaptive firework algorithm (AFWA); step 4, forecasting the regional total power demand and regional coupling power supply respectively by adopting LSSVM optimized by the AFWA algorithm; and step 5, forecasting the net power load demand on the regional coupling power supply. The present invention improves the calculation efficiency and model stability and also ensures the forecasting accuracy.

9 Claims, 5 Drawing Sheets

POWER LOAD FORECASTING METHOD IN MULTI-ENERGY COUPLING MODE

CROSS-REFERENCE TO RELATED APPLICATIONS

This application claims priority to Chinese Patent Application No. 201911374596.0 with a filing date of Dec. 27, 2019. The content of the aforementioned applications, including any intervening amendments thereto, are incorporated herein by reference.

TECHNICAL FIELD

The present invention belongs to the technical field of power load forecast, relates to a power load forecasting method, and particularly relates to a power load forecasting method in a multi-energy coupling mode.

BACKGROUND OF THE PRESENT INVENTION

In the energy revolution of the 13th Five Year Plan in China, the electrification, utilization of renewable energy and utilization of distributed energy are emphasized again. In view of this new situation, the integrated energy system solves the problems of renewable energy utilization and energy efficiency by using multiple energy forms and difference in supply and demand. However, the multi-directional flow characteristic of the energy in the integrated energy system also brings new challenges to the power production and dispatching. Accurate and effective power load forecast is an important technical means of solving the planning and dispatching problem of the power system under this situation. The load forecast in a multi-energy coupling mode aims at the new circumstance and technical challenge encountered in the power load forecast due to the complex energy flow and system structure under this situation. Therefore, the present invention proposes a power load forecasting method for the multi-energy coupling circumstance.

Under the multi-energy coupling circumstance, a large amount of renewable energy is accessed, the supply-demand interaction is reinforced, and the energy flow and system structure of the power system have apparent differences from the conventional circumstance, which is specifically reflected as follows: the park has less power demand than the park with no coupling and has the load peak and valley shift compared with the park with no coupling. Under this situation, the influence of the energy flow system of the multi-energy coupling system should be considered. However, the current load forecasting technical means fails to consider this step, so that the load condition in the multi-energy coupling scene cannot be accurately forecast.

Strengthening the load forecast is an important functional means to guarantee the safe and stable production of the electric power and to improve the operation benefit. Accurate load forecast has great significance for the power generation side to formulate reasonable production and operation schemes, for the power grid side to rationally plan the construction and arrange the dispatching and for the demand side to make timely response to the power supply-demand plan. Accurate load forecast can assist the power planning and decision and ensure the safe, reliable and economical operation of the power system, which is especially for the planning and operation of the power grid in the multi-energy coupling mode.

In recent years, due to the rapid development of the multi-energy coupling scene, a lot of enterprises and research institutions have already paid attention to the significance of the energy demand forecasting research in the multi-energy coupling mode, but there is no substantial research for the multi-energy coupling scene. Meanwhile, the existing forecasting models always lack of analysis and selection for key factors, which leads to a series of problems such as large data volume, low model forecasting accuracy, poor stability, etc.

SUMMARY OF PRESENT INVENTION

The purpose of the present invention is to overcome the defects of the prior art and to propose a power load forecasting method in a multi-energy coupling mode with reasonable design, high accuracy and high reliability.

The technical solution adopted by the present invention to solve the problem is as follows:

A load forecasting method based on a multi-energy coupling scene comprises the following steps:

Step 1, establishing a multilevel indicator system of key influencing factors of load demand in a multi-energy coupling mode, and collecting corresponding data sets according to key influencing factors in the indicator system;

Step 2, extracting key influencing factors most correlated with a total load demand and a total supply of multi-energy coupling load in the indicator system established in step 1 respectively by using a maximum and minimum redundancy method, removing surplus influencing factors with redundancy information, and finally obtaining the key influencing factors influencing the total load demand and the total supply of the multi-energy coupling load;

Step 3, normalizing the data of the key influencing factors extracted in step 2, and initializing population characteristic parameters of an AFWA adaptive firework algorithm;

Step 4, based on the key influencing factor data normalized in step 3 and initialized population characteristic parameters of the AFWA adaptive firework algorithm, forecasting regional total power demand and regional coupling power supply respectively by using LSSVM optimized by AFWA algorithm; and Step 5, based on forecast results of the regional total power demand and the regional coupling power supply in step 4, forecasting a net power load demand of the regional coupling power supply.

Further, the multilevel indicator system of the key influencing factors of the load demand in the multi-energy coupling mode in step 1 comprises factors influencing the regional total load demand and factors influencing the multi-energy coupling supply.

The factors influencing the regional total load demand comprises economic development, industry structure and demand coupling benefit;

(1) economic development comprises: three-level influencing factor indicators of gross regional product and price index;

(2) industry structure comprises: three-level influencing factor indicators of contribution of regional primary industry, contribution of regional secondary industry, contribution of regional tertiary industry;

(3) demand coupling benefit comprises three-level influencing factor indicators of investment in energy-saving systems.

The factors influencing the multi-energy coupling supply comprise: renewable energy power supply, combined supply of cooling, heating and electricity, other energy power supply and energy supply economy;

(1) The renewable energy power supply comprises: three-level influencing factor indicators of wind power generating capacity, solar power capacity, hydroelectric power generating capacity and other renewable energy power generating capacity;

(2) The combined supply of cooling, heating and electricity comprises: three-level influencing factor indicators of combined supply power;

(3) Other energy power supply comprises: three-level influencing factor indicators of garbage power generating capacity;

(4) Energy supply economy comprises: three-level influencing factor indicators of unit price of main energy and investment in energy base stations.

Further, the step 2 specifically comprises:

(1) Obtaining correlation between each influencing factor and load value by calculating mutual information of each influencing factor:

$$I(x_i, y) = \int\int p(x_i, y)\log\frac{p(x_i, y)}{p(x_i)p(y)}dx_i dy \qquad (1)$$

wherein $I(x_i, y)$ is positive correlation between $x_i$ and y, $x_i$ is the $i^{th}$ influencing factor, y is the load value, $p(x_i, y)$, $p(x_i)$ and $p(y)$ represent combined probability density of $x_i$ and y, probability density of $x_i$ and probability density of y.

(2) By calculating the maximum correlation of each influencing factor, selecting a set of m key influencing factors with maximum correlation with the load value:

$$\max D(S, y), \qquad (2)$$
$$D = \frac{1}{|S|}\sum_{x_i \in S} I(x_i, y),$$

wherein S is the set of the influencing factors $\{x_i\}$, $|S|=m$ is the number of key influencing factors to be selected, and D is a calculation result of the correlation between the selected m influencing factors and the load value.

(3) By calculating minimum redundancy of each influencing factor, selecting the set of m key influencing factors with minimum information redundancy with the influencing factors:

$$\min R(S), \qquad (3)$$
$$R = \frac{1}{|S|^2}\sum_{x_i, x_j \in S} I(x_i, x_j),$$

wherein R is a calculation result of mutual redundancy of the selected m influencing factors.

(4) Based on mRMR criterion, determining key influencing factors by adopting a gain search method, wherein assuming that m−1 characteristic influencing factors exist in S, the selection basis of the m characteristic influencing factor is shown in formula (5):

$$\max_{x_j \in X-S_{m-1}}\left[I(x_i, y) - \frac{1}{m-1}\sum_{x_i \in S_{m-1}} I(x_j, x_i)\right] \qquad (4)$$

The mRMR criterion is as follows:

$$\max \phi(D,R), \phi=D-R \qquad (5)$$

(5) Obtaining the score φ of each key influencing factor through formulas (1)-(5), and further selecting top m key influencing factors.

Further, the step 3 specifically comprises:

(1) Normalizing the original data, and converting a preprocessed data set of the original data into dimensionless data from 0 to 1; and selecting part of the data as a training set for subsequent AFWA-LSSVM model training;

The min-max standardization method is recommended as the data normalization method in the present invention. The calculation formula is shown in formula (6):

$$x^* = \frac{x - x_{min}}{x_{max} - x_{min}} \qquad (6)$$

wherein x* is a data normalization result, x is an actual value of the data set, $x_{min}$ is a minimum value in the data set, and $x_{max}$ is a maximum value in the data set.

(2) Initializing population characteristic parameters of the AFWA adaptive firework algorithm, comprising a firework position, a population size, number of fireworks, total number of sparks, upper and lower boundaries of sparks, explosion range, data dimension, function evaluation times and iteration times.

Further, the step 4 specifically comprises:

(1) First, using the AFWA algorithm to optimize penalty parameters and kernel function width parameters of the LSSVW algorithm;

(2) Then inputting key influencing factor load data after the redundancy processing in step 2 to perform the AFWA-LSSVM model training;

(3) After completing the process of optimizing the LSSVM model training by using AFWA, inputting the key influencing factor data set at a to-be-forecast time point, and calculating final load forecast results of total load demand and multi-energy coupling supply respectively.

Further, the step 4 (1) specifically comprises:

① The calculation formula for minimizing the calculation error through firework algorithm optimization is as follows:

$$\min f(X) \qquad (7)$$
$$s.t. \ g_t(X) \leq 0 \ (t = 1, 2, \cdots, m)$$

wherein $f(X)$ is a target function and is set as that an error between the LSSVM forecast value and the actual value is minimum. $g_t(X)$ is a constraint function, m is number of the constraint functions, and X is an n-dimensional optimization variable.

② Initializing the Data:

$$x_{ij}(0)=x_{ij}^L+\text{rand}(0,1)(x_{ij}^U-x_{ij}^L) \qquad (8)$$

wherein $x_{ij}(0)$ is spatial positions of initial firework individuals, i.e., initialized penalty parameters and kernel function width parameters of LSSVM; $x_{ij}^U$ and $x_{ij}^L$ are upper boundary and lower boundary of $j^{th}$ dimension respectively, i.e. parameter boundaries; rand (0,1) represents random numbers i=1, 2, . . . , N and j=1, 2, . . . , n generated in an azimuth greater than 0 and less than 1.

③ Calculating an explosion operator, wherein the explosion operator mainly comprises explosion intensity, explosion range and displacement variation, the explosion intensity is represented by the number of sparks, and the calculation way is as follows:

$$N_i = \hat{N} \cdot \frac{Y_{max} - f(X_i) + \varepsilon}{\sum_{i=1}^{N}(Y_{max} - f(X_i)) + \varepsilon} \quad (9)$$

wherein $N_i$ is number of sparks of $i^{th}$ firework and is a set value; $\hat{N}$ is a constant of controlling the total number of the sparks; $Y_{max} = \max(f(X_i))$ is an adaption value of the individual with the worst adaptability and individual with the greatest error of the load forecast result; $f(X_i)$ is an adaption value of individual $X_i$, i.e., load forecast result, and $\varepsilon$ is an extremely small constant for preventing denominator from being zero;

Meanwhile, to limit the number of the sparks, the following rules are set:

$$N_i = \begin{cases} \text{round}(N_{min}), & N_i < N_{min} \\ \text{round}(N_{max}), & N_i > N_{max} \\ \text{round}(N_i), & \text{Others} \end{cases} \quad (10)$$

wherein round( ) is a rounding function;

$$A_i = \hat{A} \cdot \frac{f(X_i) - Y_{min} + \varepsilon}{\sum_{i=1}^{N}(f(X_i) - Y_{min}) + \varepsilon} \quad (11)$$

wherein $A_i$ is an explosion range of the $i^{th}$ firework, $\hat{A}$ is the constant of limiting the maximum explosion range, and $Y_{min} = \min(f(X_i))$ is the adaption value of the firework individual with the highest forecast accuracy;

an explosion radius is a distance between a specific individual and an optimum individual:

$$\hat{s} = \arg\min_{s_i}(d(s_i, s^*)) \quad (12)$$

$$f(s_i) > f(X) \quad (13)$$

wherein d indicates the calculation of some distance, i.e. the distance between various sparks, and each spark represents the width parameter in the LSSVM function and the kernel function; $s_i$ indicates all sparks, $s^*$ indicates the individuals with best adaptability in all sparks and fireworks, and X indicates the fireworks;

Formula (12) and formula (13) indicate that the explosion radius is the distance satisfying two conditions: condition 1: selecting the distance as the shortest distance from the alternative individual to the optimum individual; condition 2: alternative individuals are individuals having worse adaptability than the fireworks of this generation; and then carrying out the displacement operation for the fireworks from different dimensions:

$$\Delta x_{ij} = x_{ij} + \text{rand}(0, A_i) \quad (14)$$

④ Variation operator:

$$x_{ij} = x_{ij} g \quad (15)$$

wherein $g \sim N(1,1)$ is Gaussian distribution with both mean and variance of 1.

⑤ Mapping rule:

Mapping the sparks beyond the boundary to a limit range by using a modular arithmetic rule:

$$x_{ij} = x_{ij}^L + |x_{ij}^L| \% (x_i^U - x_{ij}^L) \quad (16)$$

wherein % represents modular arithmetic, $x_{ij}$ represents the position of $i_{th}$ individual on $j_{th}$ dimension, and $x_{ij}^U$, $x_{ij}^L$ indicate the upper boundary and lower boundary on the $j_{th}$ dimension respectively.

⑥ Selection Operation:

Calculating and selecting the distance between two individuals by using Euclidean distance.

$$R(X_i) = \sum_{q=1}^{K} d(X_i, X_q) = \sum_{q=1}^{K} \|X_i - X_q\| \quad (17)$$

wherein $R(X_i)$ indicates the sum of the distance from $X_i$ to all other individuals, $d(X_i, X_q)$ indicates the Euclidean distance between any two individuals $X_i \smallsetminus X_q$, and K are position sets of all sparks after the Gaussian compilation, $q \in K$;

$$p(X_i) = \frac{R(X_i)}{\sum_{q \in K} R(X_i)} \quad (18)$$

wherein $p(X_i)$ indicates the selection probability of $X_i$; and the fireworks or sparks $X_i$ selected after reaching the maximum iteration times is the optimum penalty parameter and width parameter factor vector.

Further, the step 4 (2) specifically comprises:

① After the nonlinear mapping, the obtained final decision function is as follows:

$$f(x) = w^T \cdot \varphi(x) + b \quad (19)$$

wherein $w \in R^k (k > d)$ is a high-dimensional characteristic weight vector, i.e. the influencing degree of each key influencing factor on the load value; $x_i \in R^d$ is the input of d-dimensional training samples and is specifically the sample of each key influencing factor; $y_i \in R$ is the output of training samples and the load value corresponding to the corresponding key influencing factor; and $b \in R$ is an offset.

② According to the minimization principle of the structural risk, the forecast error is minimized to find the optimum high-dimensional characteristic weight vector w and the offset b. The optimization problem is obtained as follows:

$$\min \frac{1}{2} w^T w + r \sum_{i=1}^{n} \xi_i^2 \quad (20)$$

wherein $r > 0$ is penalty parameter, and $\xi_i$ is a slack variable.

③ Compared with a standard support vector machine algorithm, differences exist in constraint conditions:

$$y[w^T \cdot \varphi(x_i) + b] = 1 - \xi_i, i = 1, 2, \ldots, n \quad (21)$$

④ Solving the optimization problem by using Lagrangian function:

$$L = \frac{1}{2}w^T \cdot w + r \cdot \frac{1}{2}\sum_{i=1}^{n}\xi_i^2 - \sum_{i=1}^{n}\alpha_i\{y_i[w^T \cdot \varphi(x_i) + b] - 1 + \xi_i\} \quad (22)$$

$$\text{s.t.} \begin{cases} w = \sum_{i=1}^{n}\alpha_i y_i \varphi(x_i) \\ \sum_{i=1}^{n}\alpha_i y_i = 0 \\ \alpha_i = r\xi_i \\ y_i[w^T \cdot \varphi(x_i) + b] - 1 + \xi_i = 0 \end{cases}$$

wherein $\alpha_i$ is a Lagrangian multiplicator vector, and $\alpha_i > 0$, i=1, 2, . . . , n.

⑤ Obtaining the final forecasting function as shown in formula (23):

$$f(x) = \sum_{i=1}^{n}\alpha_i K(x, x_i) + b \quad (23)$$

wherein $K(x_i, x_j) = \varphi(x_i)^T \varphi(x_j)$ is a kernel function satisfying Mercer conditions:

A radial basis kernel function is used as the kernel function, as shown in formula (24):

$$K(x, x_i) = \exp\left(-\frac{\|x - x_i\|^2}{2g^2}\right) \quad (24)$$

wherein g is a width factor of the kernel function.

Further, the step 4 (3) specifically comprises:

① inputting the data sets of total load key influencing factors at a required forecasting time period into the AFWA-LSSVM model completing the total load data training, and then running the algorithm to obtain the forecasting result of the total load.

② inputting the data sets of multi-energy coupling key influencing factors at a required forecasting time period into the AFWA-LSSVM model completing the multi-energy coupling data training, and then running the algorithm to obtain the forecasting result of the multi-energy coupling.

Further, the step 5 specifically comprises:

The net power load in step 5 is a difference between the total demand load and the regional coupling supply load. The calculation method of the energy demand based on this scene is shown in formula (25):

$$L_t = L_n - L_c \quad (25)$$

wherein $L_t$ is the load demand to be provided by the power grid, i.e. the net power load demand of the regional coupling power supply, $L_n$ is the total demand of all loads, and $L_c$ is energy supply of a non-power-grid composition in the multi-energy coupling mode.

The present invention has the advantages and beneficial effects:

1. The present invention designs a load forecasting model for the multi-energy coupling scene, which fully considers the complexity and linkage of the multi-energy coupling scene, analyzes the key factors based on the scene to extract influencing factors influencing the load forecast, and designs a big data processing method and selects the most important influencing factors for actual forecast, thereby improving the calculation efficiency and model stability and also ensuring the forecast accuracy. Meanwhile, the present invention proposes the support vector machine algorithm optimized by the adaptive firework algorithm for the first time and applies the algorithm to the field of load forecast to achieve a good effect. The average relative error in the quarterly total load forecast is 4%, and the average relative error in the quarterly multi-energy coupling forecast is about 2%. Therefore, a useful tool is provided for forecasting and calculating the power grid demand, and the load forecasting accuracy is effectively improved. The present invention has good adaptability to various load forecasting scenes, that is, the method proposed in the present invention can be used for forecast in either southwestern region of China or northeast region of China.

2. The present invention mainly uses the scene analysis for the load forecasting research in the multi-energy coupling mode to obtain main factors influencing the power demand and supply of regional power grid. The obtained analysis result of the load forecasting influencing factors is the load forecasting result with multi-energy coupling pertinence. In the mRMR-AFWA-LSSVM load forecasting model, the mRMR model reduces the forecasting calculation time through the data screening, AFWA optimizes LSSVM to improve the forecasting accuracy, and the LSSVM forecasting method has good adaptability to the data characteristics of multi-energy coupling small samples and high-dimensional samples. The power grid demand calculation method of the total load demand minus the multi-energy coupling total supply has high practical application performance for the power grid.

DESCRIPTION OF THE DRAWINGS

FIGS. 3(A)-3(C) are a calculation schematic diagram of net loads of the present invention, in which FIG. 3(A) is the calculation schematic diagram of net loads for the multi-energy coupling (forecasting set), FIG. 3(B) is the calculation schematic diagram of net loads for the multi-energy coupling (training set), and FIG. 3(C) is the calculation schematic diagram of net loads for the total demand (forecasting set); and FIG. 3(D) is the calculation schematic diagram of net loads for the total demand (training set); and FIG. 3(E) is the calculation schematic diagram showing of the calculation result of power grid load demand (forecasting set); and FIG. 3(F) is the calculation schematic diagram showing of the calculation result of power grid load demand (training set).

DETAILED DESCRIPTION OF PREFERRED EMBODIMENTS

The present invention will be further described below in detail with reference to the accompanying drawings.

At present, the core problem of the load forecasting research is key influencing factors and model selection. The key influencing factors are mainly analyzed in three aspects, i.e. economy, energy and environment. The model selection is to select the model applicable to the current scene mainly from novel technical means such as cloud computation, big data, artificial intelligence, etc. It can be concluded that the load forecasting technology has already formulated a lot of specific solutions. However, among the existing load forecasting research achievements, there is almost no power load forecasting research for the multi-energy coupling circumstance. Therefore, it is required to analyze the scene characteristics and key influencing factors according to the current development situation of the multi-energy coupling and to establish a suitable power load forecasting model in the multi-energy coupling circumstance according to the analysis result.

Since the multi-energy coupling scene has developed for a relatively short time, the corresponding medium-long-term power load forecasting technology is immature and has the characteristics of less samples, more influencing factors, complex correlation, etc. In the designing process of the forecasting model and method, it is required to establish a complete and accurate indicator system based on these characteristics in the characteristic selection process of the multi-energy coupling scene on one hand; and on the other hand, it is required to ensure the full use of the information and accuracy and effectiveness of the forecasting result in the establishing process of the forecasting model of the multi-energy coupling scene.

Figure 1:
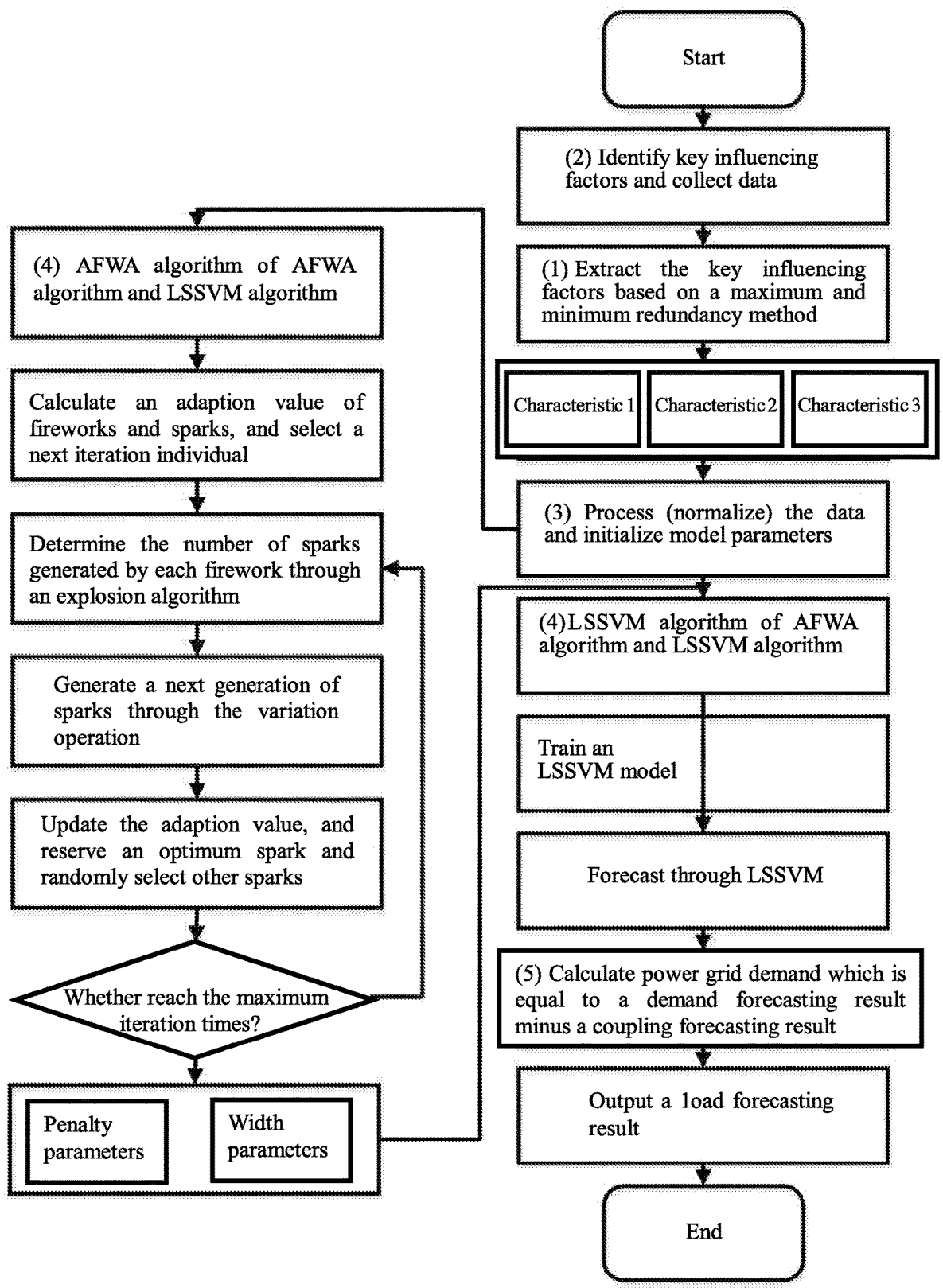
FIG. 1 is a load forecasting flow chart in a multi-energy coupling mode of the present invention.

A power load forecasting method based on a multi-energy coupling scene, as shown in FIG. 1, includes the following steps:

Step 1, establishing a multilevel indicator system of key influencing factors of load demand in a multi-energy coupling mode, and collecting corresponding data sets according to the key influencing factors in the indicator system.

The multilevel indicator system of the key influencing factors of the load demand in the multi-energy coupling mode in step 1 includes factors influencing the regional load total demand and factors influencing the multi-energy coupling supply.

The factors influencing the regional load total demand includes economic development, industry structure and demand coupling benefit;

(1) the economic development includes: three-level influencing factor indicators of gross regional product and price index;

(2) the industry structure includes: three-level influencing factor indicators of contribution of regional primary industry, contribution of regional secondary industry, contribution of regional tertiary industry;

(3) the demand coupling benefit includes three-level influencing factor indicators of investment in energy-saving systems.

The factors influencing the multi-energy coupling supply comprise: renewable energy power supply, combined supply of cooling, heating and electricity, other energy power supply and energy supply economy;

(1) the renewable energy power supply includes: three-level influencing factor indicators of wind power generating capacity, solar power capacity, hydroelectric power generating capacity and other renewable energy power generating capacity;

(2) the combined supply of cooling, heating and electricity includes: three-level influencing factor indicators of combined supply power;

(3) other energy power supply includes: three-level influencing factor indicators of garbage power generating capacity;

(4) energy supply economy includes: three-level influencing factor indicators of unit price of main energy and investment in energy base stations.

Figure 2:
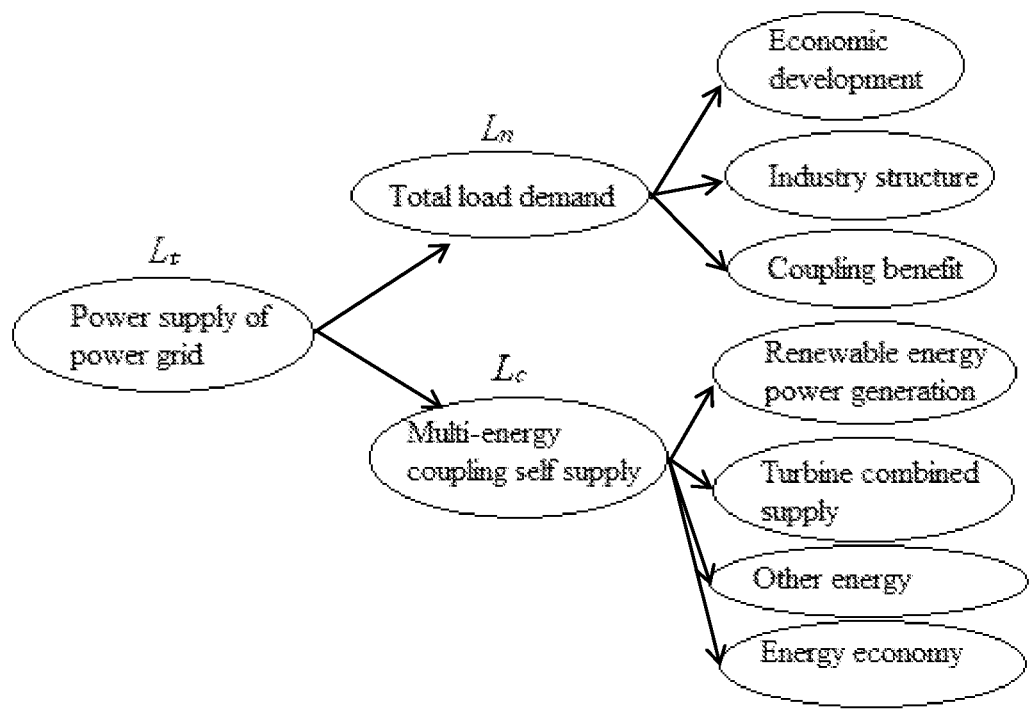
FIG. 2 shows analysis results of multi-energy coupling key influencing factors of the present invention.

In the present embodiment, FIG. 2 shows an analysis method of multi-energy coupling key influencing factors provided by the present invention: factors influencing the regional load total demand mainly consider the development and change rule of the load and social and economic influencing factors as well as overall coupling benefit brought by the overall investment and construction of the regional multi-energy coupling. The analysis on the multi-energy coupling supply mainly considers the direct contradiction effect of the electric power generated by the multi-energy self-supply ways of the regional energy on the energy demand as well as relevant influencing factors of the energy economic market. Based on this, a multilevel indicator system of load demand key influencing factors in a multi-energy coupling mode is obtained, and corresponding data sets are collected according to the analysis result of the key influencing factors.

By considering the difficulty in obtaining the data and the data requirement for actual calculation, the key influencing factors are set, as shown in Table 1.

TABLE 1

Key influencing factors of load demand in multi-energy coupling mode

| A. Key content | B. Key content decomposition | C. Influencing factor |
| --- | --- | --- |
| A1. Total demand of energy | B11. Economic development | C11. Gross regional product |
| | | C12. Price index |
| | B12. Industry structure | C21. Contribution of regional primary industry |
| | | C22. Contribution of regional secondary industry |
| | | C23. Contribution of regional tertiary industry |
| | B13. Demand coupling benefit | C31. Investment in energy-saving systems |
| A2. Multi-energy coupling supply (load) | B21. Renewable energy power supply | C41. Wind power generating capacity |
| | | C42. Solar power supply |
| | | C43. Hydroelectric power generating capacity |
| | | C44. Other renewable |

TABLE 1-continued

Key influencing factors of load demand in multi-energy coupling mode

| A. Key content | B. Key content decomposition | C. Influencing factor |
|---|---|---|
| | | energy power generating capacity |
| | B22. Combined supply of cooling, heating and electricity | C51. Combined supply power |
| | B23. Other energy power supply | C61. Garbage power generating capacity |
| | B24. Energy supply economy | C71. Unit price of main energy (coal) |
| | | C72. Investment on energy base station |

Table 1 mainly includes the three-level forecasting indicator system, wherein key content indicators of primary items include: A1, energy demand and A2, multi-energy coupling supply; A1, the energy total demand includes secondary key content decomposition indicators: B11, economic development, B12, industry structure, and B13, demand coupling benefit; A2, the multi-energy coupling supply (load) includes secondary key content decomposition indicators: B21, renewable energy power supply, B22, combined supply of cooling, heating and electricity, B23, other energy power supply, and B24, energy supply economy; B11, the economic development includes tertiary influencing factor indicators: C11, gross regional product, and C12, price index; B12, the industry structure includes tertiary influencing factor indicators: C21, contribution of regional primary industry, C22, contribution of regional secondary industry, and C23, contribution of regional tertiary industry; B13, the demand coupling benefit includes tertiary influencing factor indicators: C31, investment in energy-saving systems, B21, the renewable energy power supply includes tertiary influencing factor indicators: C41, wind power generating capacity, C42, solar power supply, C43, hydroelectric power generating capacity, and C44, other renewable energy power generating capacity; B22, the combined supply of cooling, heating and electricity includes tertiary influencing factor indicators: C51, combined supply power; B23, other energy power supply includes tertiary influencing factor indicators: C61, garbage power generating capacity; and B24, the energy supply economy includes tertiary influencing factor indicators: C71, unit price of main energy (coal), and C72, investment in energy base stations.

Data sets of the corresponding indicator system are collected according to the key indicator system shown in table 1 to prepare for the model training and parameter optimization.

In the present invention, the power grid load changes in the southwestern region of China from the first quarter of 2004 to the first quarter of 2019 are taken as an example for empirical analysis.

Step 2, extracting key influencing factors most correlated with a total load demand and multi-energy coupling load total supply in the indicator system established in step 1 respectively by using a maximum and minimum redundancy method, removing surplus influencing factors with redundancy information, and finally obtaining the key influencing factors influencing the total load demand and the multi-energy coupling load total supply.

Further, the step 2 specifically includes:

Mutual information (MI) is a theoretical method for evaluating the correlation of variables. The minimal redundancy maximal relevance (mRMR) algorithm is a characteristic selection method for maximizing the correlation between the characteristic variables and target variables and minimizing the redundancy information based on the mutual information theory.

(1) Obtaining the correlation between each influencing factor and the load value by calculating mutual information of each influencing factor:

$$I(x_i, y) = \int\int p(x_i, y)\log\frac{p(x_i, y)}{p(x_i)p(y)}dx_i dy \quad (1)$$

wherein $I(x_i,y)$ is positive correlation between $x_i$ and y, is the $i^{th}$ influencing factor, y is the load value, $p(x_i,y)$, $p(x_i)$ and $p(y)$ represent a combined probability density of $x_i$ and y, probability density of $x_i$ and probability density of y respectively.

The correlation between each influencing factor and the load value can be specifically calculated by calculating mutual information, and the greater the correlation is, the bigger the $I(x_i,y)$ is.

(2) Selecting a set of m key influencing factors with the greatest correlation with the load value by calculating the maximum correlation of each influencing factor:

$$\max D(S, y), \quad (2)$$
$$D = \frac{1}{|S|}\sum_{x_i \in S} I(x_i, y),$$

wherein S is the set of the influencing factors $\{x_i\}$, $|S|=m$ is the number of key influencing factors to be selected, and D is a calculation result of the correlation between the selected m influencing factors and the load value.

Through this process, a set of m key influencing factors with the greatest correlation with the load value is selected.

(3) By calculating the minimum redundancy of each influencing factor, selecting a set of m key influencing factors with minimum information redundancy with the influencing factors:

$$\min R(S), \quad (3)$$
$$R = \frac{1}{|S|^2}\sum_{x_i, x_j \in S} I(x_i, x_j),$$

wherein R is a calculation result of mutual redundancy of the selected m influencing factors.

Through this process, a set of m key influencing factors with minimum information redundancy is selected from the influencing factors:

(4) Based on the mRMR criterion, determining key influencing factors by adopting a gain search method, wherein assuming that m−1 characteristic influencing factors exist in S, the selection basis of the $m^{th}$ characteristic influencing factor is shown in formula (5):

$$\max_{x_j \in X - S_{m-1}} \left[ I(x_i, y) - \frac{1}{m-1} \sum_{x_i \in S_{m-1}} I(x_j, x_i) \right] \quad (4)$$

The mRMR criterion is as follows:

$$\max \phi(D,R), \phi = D - R \quad (5)$$

The mutual information difference (MID) is selected here, that is, the selected influencing factor set shall have greater correlation D with the load value, and the redundancy R among the factors shall be small.

(5) Obtaining the score φ of each key influencing factor (the $m^{th}$ influencing factor) through formulas (1)-(5), and further selecting top m key influencing factors.

In present embodiment, the characteristic influencing factors are selected according to the formulas (1)-(5), and the selection results are shown in Table 2 and table 3. It can be seen that the local multi-energy coupling self-supply load supply is mainly influenced by the wind power and the hydroelectric power. The load total demand is apparently affected by the price index, gross domestic product and total investment in fixed assets.

The multi-energy coupling characteristic influencing factors of top three scores are selected and inputted into the AFWA-SVM model to perform the subsequent calculation.

Step 3, normalizing the data of the key influencing factors extracted in step 2, and initializing population characteristic parameters of an AFWA adaptive firework algorithm.

The key influencing factors extracted in step 2 cannot be directly inputted into the model for forecast. In this step, the model input and model output are identified. The data is normalized for the model calculation. The parameters of the forecasting model are also determined.

Further, the step 3 specifically includes:

(1) first, normalizing the original data, and converting the preprocessed data set of the original data into dimensionless data from 0 to 1; and selecting part of the data as a training set for subsequent model training;

The min-max standardization method is recommended as the data normalization method in the present invention. The calculation formula is shown in formula (6):

$$x^* = \frac{x - x_{min}}{x_{max} - x_{min}} \quad (6)$$

wherein x* is a data normalization result, x is an actual value of the data set, $x_{min}$ is a minimum value in the data set (the data set of key influencing factors and the load data set), and $x_{max}$ is a maximum value in the data set.

(2) Then, initializing population characteristic parameters of the AFWA adaptive firework algorithm, including a fireworks location, a population size, number of fireworks, total number of sparks, upper and lower bound of sparks, explosion range, data dimension, function evaluation times and iteration times;

TABLE 2

Multi-energy coupling mRMR calculation results

| Characteristic factor | Cumulative value of solar power generating capacity (ten thousand kWhs) | Cumulative value of natural gas output (hundred million cubic meters) | Cumulative value of wind power generating capacity (hundred million kWhs) | Cumulative value of hydroelectric power generating capacity (hundred million kWhs) | Cumulative value of other power generating capacity (hundred million kWhs) | Investment amount (ten thousand Yuan) | Fuel price index |
|---|---|---|---|---|---|---|---|
| mRMR value | 0 | −0.16 | 1.63 | 0.94 | 0.52 | 0.62 | 0.60 |
| Order | 6 | 7 | 1 | 2 | 5 | 3 | 4 |

TABLE 3 mRMR calculation results of total load demand

| Characteristic factor | Contribution rate of primary industry in current season (%) | Contribution rate of secondary industry in current season (%) | Contribution rate of tertiary industry in current season (%) | Total investment in fixed assets (hundred million Yuan) | Gross domestic product in current season (hundred million Yuan) | Data of price index |
|---|---|---|---|---|---|---|
| mRMR value | 0 | −0.066 | 0.73 | 0.96 | 0.94 | 1.30 |
| Order | 5 | 6 | 4 | 2 | 3 | 1 |

Some specific values of the firework position, population size, number of fireworks, total number of sparks, upper and lower boundaries of sparks and explosion range have good effect according to the research of experts and are generally set and may also be adjusted. The data dimension is set according to the characteristics of the optimization model and is set as 2 here. The function evaluation times and the iteration times may be determined according to the operation efficiency and accuracy.

In present embodiment, the parameters of the AFWA model are initialized. The initialized parameters are shown in Table 4.

TABLE 4

Parameter setting of adaptive firework algorithm

| | |
|---|---|
| Population size | 5 |
| Number of fireworks of Gaussian explosion | 5 |
| Total number of sparks | 200 |
| Upper boundary parameters of sparks | 100 |
| Lower boundary parameters of sparks | 0.1 |
| Control parameters of the explosion range | 100 |
| Data dimension | 2 |
| Function evaluation times | 10000 |
| Iteration times | 1 |

Step 4, based on the data of the key influencing factors normalized in step 3 and initialized population characteristic parameters of the AFWA (adaptive firework algorithm), forecasting regional total power demand and regional coupling power supply respectively by using LSSVM (Least Squares Support Vector Machine) optimized by AFWA (adaptive firework algorithm).

In Step 4, model optimization and calculation are carried out for the initialized parameters in step 3.

Further, the step 4 specifically includes:

(1) First, using the AFWA algorithm to optimize penalty parameters and kernel function width parameters of the LSSVW algorithm, thereby improving the forecasting accuracy and calculation efficiency of LSSVM;

In present embodiment, in a way of minimizing the calculation error through the optimization of the firework algorithm, the AFWA algorithm is used to optimize the penalty parameters and kernel function width parameters of the LSSVM algorithm. The AFWA algorithm mainly includes four calculation parts, i.e. explosion operator, variation operation, mapping rule and selection operation. According to the algorithm, the firework position is first formed by initializing the data, i.e. original penalty parameters and width parameters. Through the explosion algorithm, the screening range is enlarged and the function is converged. Through the variation operation, novel fireworks (penalty parameter and width parameter positions) are formed to ensure the complete search. Overflow is prevented by the mapping rule. The optimum fireworks (penalty parameter and width parameter positions) are continuously selected by the selection operation to reduce the calculation error of LSSVM. The specific calculation way of the optimization problem is described as follows:

Further, the step 4 (1) specifically includes:

① The calculation formula for minimizing the calculation error through the optimization of firework algorithm is as follows:

$$\min f(X) \quad (7)$$
$$\text{s.t.} \quad g_t(X) \le 0 \ (t = 1, 2, \cdots, m)$$

wherein $f(X)$ is a target function and is set as that the error between the LSSVM forecast value and the actual value is minimum (the LSSVM model is already inserted into the AFWA adaptive function). $g_t(X)$ is a constraint function (since the AFWA is used to optimize the two parameters of LSSVM, here is set as the parameter range), m is the number of the constraint functions, and X is n-dimensional optimization variable.

The process of the AFWA algorithm is interpreted based on this.

② Initializing the Data:

$$x_{ij}(0) = x_{ij}^L + \text{rand}(0,1)(x_{ij}^U - x_{ij}^L) \quad (8)$$

wherein $x_{ij}(0)$ is a spatial position of initial firework individual, i.e. penalty parameter and kernel function width parameter of initialized LSSVM; $x_{ij}^U$ and $x_{ij}^L$ are upper boundary and lower boundary of $j_{th}$ dimension respectively, i.e. parameter boundary; rand (0,1) represents a random number i=1, 2, . . . , N and j=1, 2, . . . , n generated in an azimuth greater than 0 and less than 1;

③ Calculating an explosion operator, wherein the explosion operator mainly includes explosion intensity, explosion range and displacement variation, the explosion intensity is represented by the number of sparks, and the calculation way is as follows:

$$N_i = \hat{N} \cdot \frac{Y_{max} - f(X_i) + \varepsilon}{\sum_{i=1}^{N}(Y_{max} - f(X_i)) + \varepsilon} \quad (9)$$

wherein $N_i$ is the number of sparks of $i^{th}$ firework and is a set value; N is a constant for controlling the total number of the sparks; $Y_{max} = \max(f(X_i))$ is an adaptive value of the individual with the worst adaptability and the individual with the maximum error of the load forecasting result; $f(X_i)$ is adaption value of the individual $X_i$, i.e. load forecasting result, and $\varepsilon$ is an extremely small constant for preventing denominator from being zero;

Meanwhile, to limit the number of the sparks, the following rules are set:

$$N_i = \begin{cases} \text{round}(N_{min}), & N_i < N_{min} \\ \text{round}(N_{max}), & N_i > N_{max} \\ \text{round}(N_i), & \text{Others} \end{cases} \quad (10)$$

wherein round( ) is a rounding function;

$$A_i = \hat{A} \cdot \frac{f(X_i) - Y_{min} + \varepsilon}{\sum_{i=1}^{N}(f(X_i) - Y_{min}) + \varepsilon} \quad (11)$$

wherein $A_i$ is an explosion range of the $i^{th}$ firework, $\hat{A}$ is the constant of limiting the maximum explosion range, and $Y_{min} = \min(f(X_i))$ is the adaption value of the firework (width parameter and penalty parameter) individual with the highest forecasting accuracy;

For the reasonability of the calculation method for the explosion radius of the traditional firework algorithm, the adaptive firework algorithm uses the generated sparks to calculate the optimum firework explosion radius so as to realize the adaptive adjustment of the explosion radius.

An explosion radius is a distance between a specific individual and an optimum individual:

$$\hat{s} = \arg\min_{s_i}(d(s_i, s^*))  \quad (12)$$

$$f(s_i) > f(X) \quad (13)$$

wherein d indicates the calculation of a distance, i.e. the distance among various sparks, and each spark represents the width parameter in the LSSVM function and the kernel function; $s_i$ indicates all sparks, s* indicates the individual with the best adaptability in all sparks and fireworks, and X indicates the fireworks;

The formula (12) and formula (13) indicate that the explosion radius is the distance satisfying two conditions: a: the selected distance is the shortest distance from the alternative individual to the optimum individual; b: alternative individuals are individuals having worse adaptability than the fireworks of this generation;

Then the displacement operation is carried out for the fireworks from different dimensions:

$$\Delta x_{ij} = x_{ij} + \text{rand}(0, A_i) \quad (14)$$

④ Variation Operator:

Gaussian variation is mainly used in the present invention.

$$x_{ij} = x_{ij} g \quad (15)$$

wherein $g \sim N(1,1)$ is Gaussian distribution with both mean and variance of 1.

⑤ Mapping rule: the mapping rule is an algorithm that maps the sparks beyond the boundary to a limited range through a method, mainly including modular arithmetic rules, mirror reflection rules, random mapping rules, etc. Modular arithmetic rules are used here.

$$x_{ij} = x_{ij}^L + |x_{ij}^L| \% (x_{ij}^U - x_{ij}^L) \quad (16)$$

wherein % represents modular arithmetic, $x_{ij}$ represents the position of $i^{th}$ individual on $j_{th}$ dimension, and $x_{ij}^U$, $x_{ij}^L$ indicate the upper boundary and lower boundary on the $j_{th}$ dimension respectively.

⑥ Selection operation: the selection operation adopts the distance-based selection and random selection. A distance between two individuals is calculated and selected by using Euclidean distance.

$$R(X_i) = \sum_{q=1}^{K} d(X_i, X_q) = \sum_{q=1}^{K} \|X_i - X_q\| \quad (17)$$

wherein $R(X_i)$ indicates the sum of the distance from $X_i$ to all other individuals, $d(X_i, X_q)$ indicates the Euclidean distance between any two individuals $X_i$、$X_q$, and K is the position set of all sparks after the Gaussian compilation, $q \in K$;

$$p(X_i) = \frac{R(X_i)}{\sum_{q \in K} R(X_i)} \quad (18)$$

wherein $p(x_i)$ indicates the selected probability of $X_i$; and the fireworks or sparks $X_i$ selected after reaching the maximum iteration times are the optimum penalty parameter and width parameter factor vectors.

(2) Then, inputting the processed key influencing factor load data to perform the model training;

The main model in the process of inputting the processed key influencing factor load data to perform the model training is LSSVM model. The optimum penalty parameter and width parameter value are obtained through the AFWA model in step 4(1), and the model forms a fitted forecasting function through the machine learning (continuous training) process, thereby realizing the forecasting process. Aiming at the minimum functional forecasting error in the training process, the optimum high-dimensional characteristic weight vector w and offset b are found, and the forecasting fitting function is finally formed to complete the training process.

Further, the step 4 (2) specifically includes:

① After the nonlinear mapping $\psi(x) = (\varphi(x_1), \varphi(x_2), \ldots, \varphi(x_n))$, the final decision function is obtained as follows:

$$f(x) = w^T \cdot \varphi(x) + b \quad (19)$$

wherein $w \in R^k (k>d)$ is a high-dimensional characteristic weight vector, i.e. the influencing degree of each key influencing factor on the load value; $x_i \in R^d$ is the input of d-dimensional training samples and is specifically samples of each key influencing factor; $y_i \in R$ is the output of training samples and the load value corresponding to the corresponding key influencing factor; and $b \in R$ is an offset.

② According to the minimization principle of the structure risk, the forecasting error is minimized to find the optimum high-dimensional characteristic weight vector w and the offset b. The optimization problem is obtained as follows:

$$\min \frac{1}{2} w^T w + r \sum_{i=1}^{n} \xi_i^2 \quad (20)$$

wherein $r > 0$ is the penalty parameter, and $\xi_i$ is a slack variable.

③ Compared with a standard support vector machine algorithm, differences exist in constraint conditions:

$$y[w^T \cdot \varphi(x) + b] = 1 - \xi_i, i = 1, 2, \ldots, n \quad (21)$$

④ Solving the optimization problem by using Lagrangian function:

$$L = \frac{1}{2} w^T \cdot w + r \cdot \frac{1}{2} \sum_{i=1}^{n} \xi_i^2 - \sum_{i=1}^{n} \alpha_i \{y_i [w^T \cdot \varphi(x_i) + b] - 1 + \xi_i\} \quad (22)$$

$$\text{s.t.} \begin{cases} w = \sum_{i=1}^{n} \alpha_i y_i \varphi(x_i) \\ \sum_{i=1}^{n} \alpha_i y_i = 0 \\ \alpha_i = r \xi_i \\ y_i [w^T \cdot \varphi(x_i) + b] - 1 + \xi_i = 0 \end{cases}$$

wherein $\alpha_i$ is a Lagrangian multiplicator vector, and $\alpha_i > 0$, $i = 1, 2, \ldots, n$.

(5) Obtaining the final forecasting function as shown in formula (23):

$$f(x) = \sum_{i=1}^{n} \alpha_i K(x, x_i) + b \quad (23)$$

wherein $\kappa(x_i, x_j) = \varphi(x_i)^T \varphi(x_j)$ is a kernel function satisfying Mercer conditions:

A radial basis kernel function is used as the kernel function, as shown in formula (24):

$$K(x, x_i) = \exp\left(-\frac{\|x - x_i\|^2}{2g^2}\right) \quad (24)$$

wherein g is a width factor of the kernel function.

(3) After completing the process of optimizing the LSSVM model training by using AFWA, inputting the data set of key influencing factors at a required forecasting time point, and calculating the final load forecasting results of total load demand and multi-energy coupling supply respectively.

After the AFWA optimization and LSSVM model training process is completed, the required forecasting model can be obtained, and then as long as there is data input, the output of required forecasting results can be obtained. The data sets of key influencing factors of total load demand and multi-energy coupling supply at the required forecasting time point are inputted respectively, and the final load forecasting results of the total load demand and multi-energy coupling supply can be obtained by model calculation.

In present embodiment, the penalty parameters and kernel function width parameters after the LSSVM is optimized by AFWA are shown in Table 5:

TABLE 5

Parameter setting of optimized Lssvm

| | Penalty parameter c | Width parameter g |
|---|---|---|
| Multi-energy coupling | 30.9715 | 60.4294 |
| Total load demand | 26.4350 | 61.0462 |

The optimized parameters are used to train the multi-energy coupling demand and total demand LSSVM model. After the training, the selected key influencing factor set is inputted for forecast. Through this step, the regional total demand forecasting result and the regional multi-energy coupling power supply forecasting result can be obtained. The results are further calculated to obtain the energy demand forecasting result in the multi-energy coupling mode.

Figure 3:
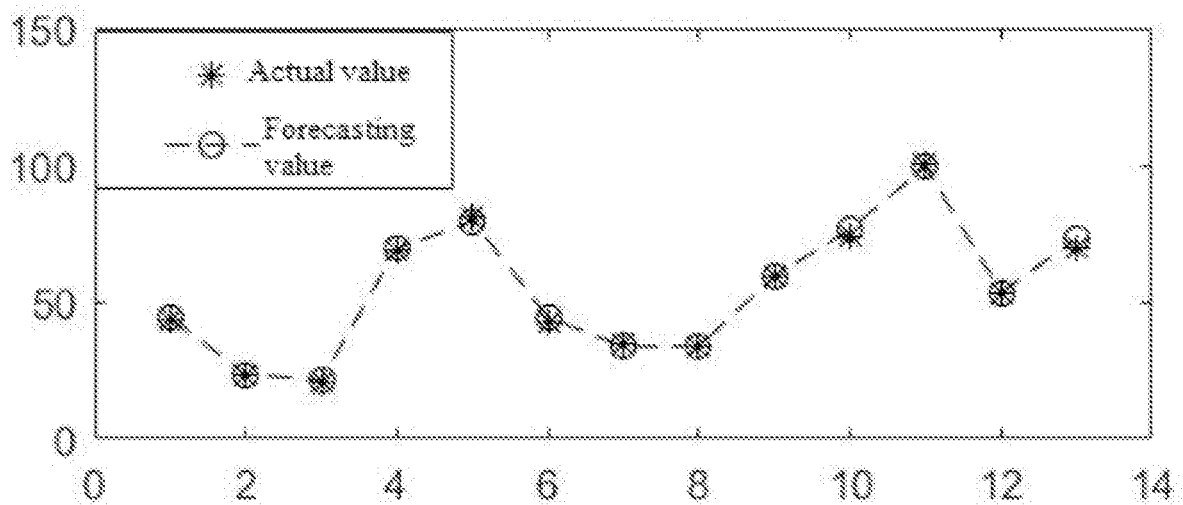
Figure 3:
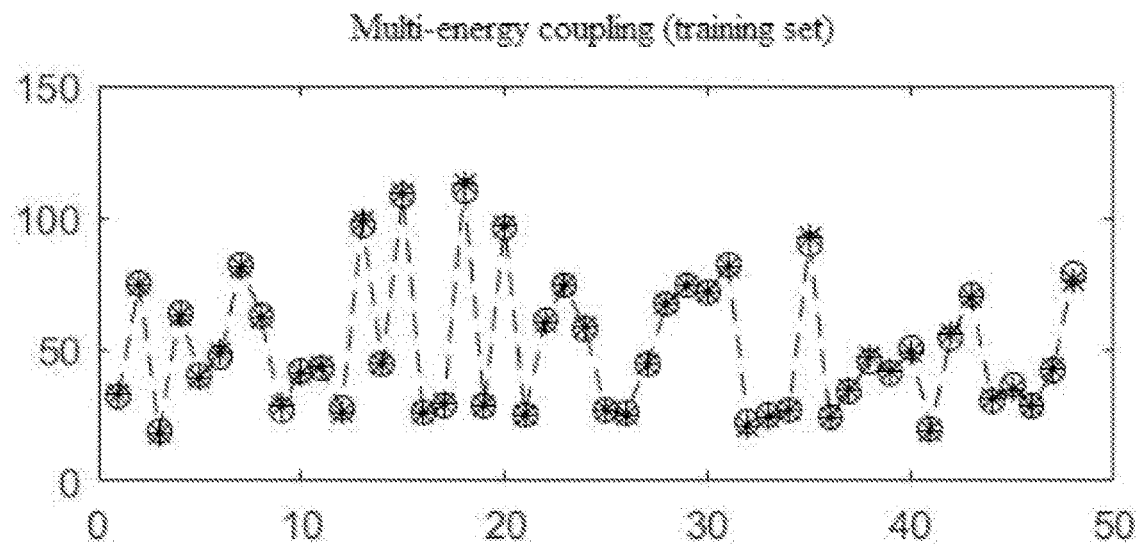
Figure 3:
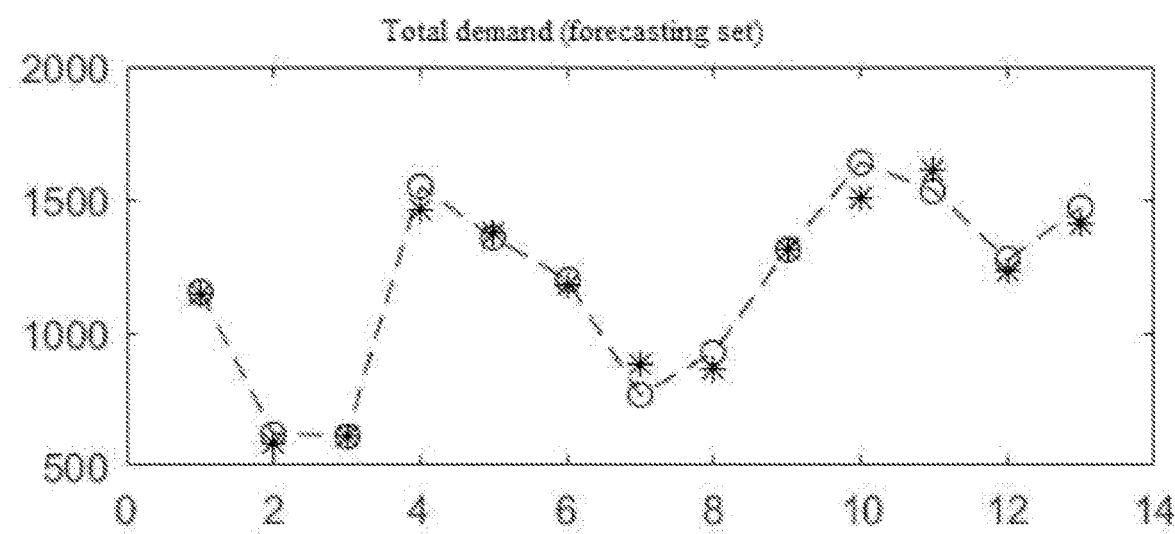
Figure 3:
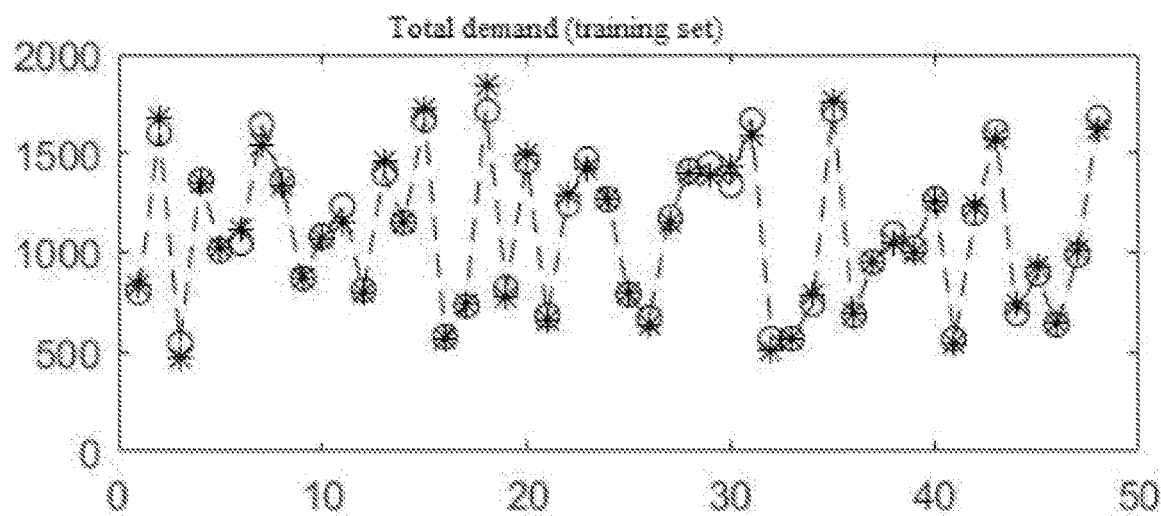
Figure 3:
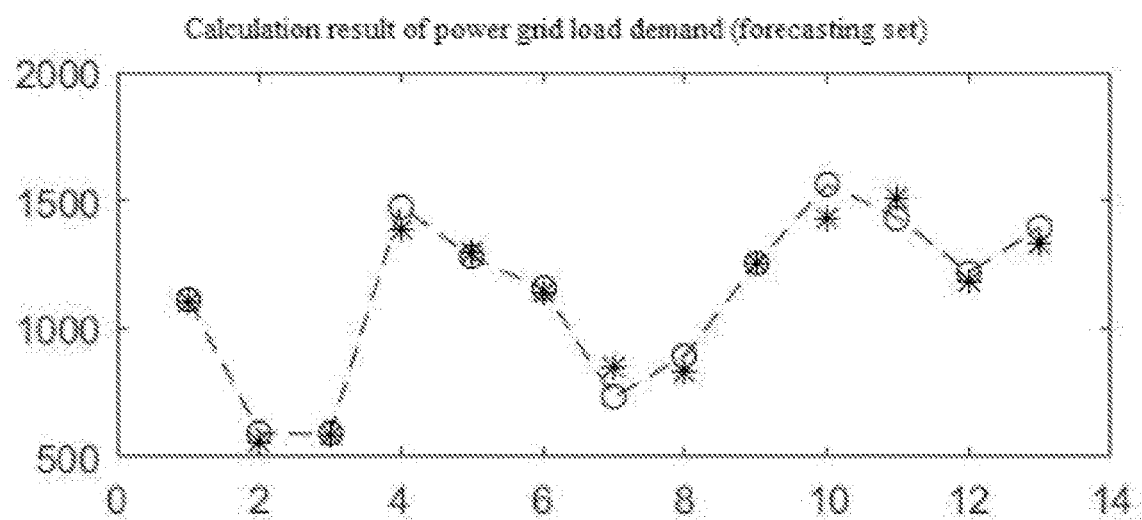
Figure 3:
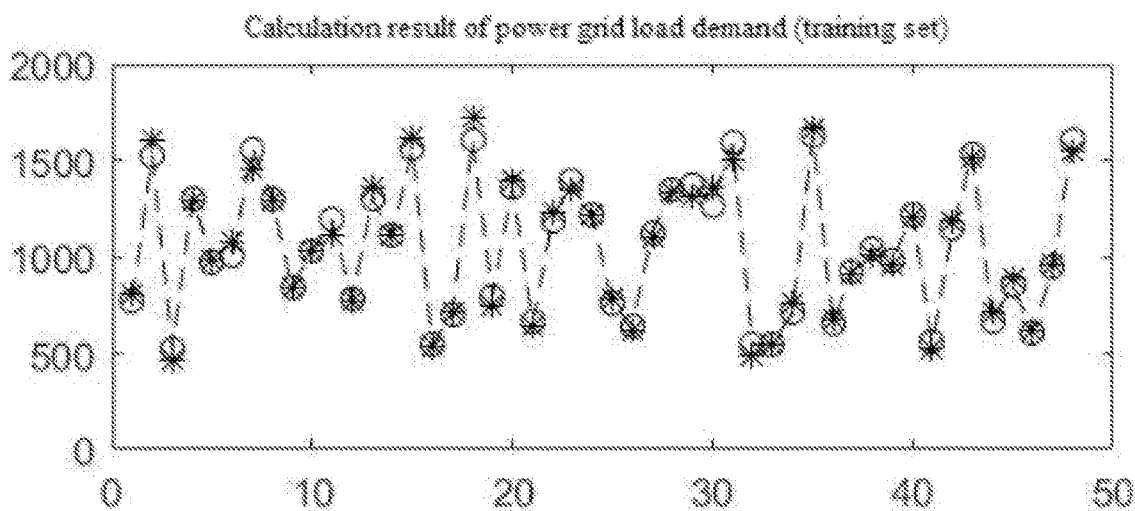

The final forecasting result data is shown in Table 6. In order to more intuitively reflect the effect of the present invention, the results are shown in FIGS. 3(A)-3(C). The graph of the corresponding training set in FIGS. 3(A)-3(C) shows the fitting degree of the existing data forecasting result. The multi-energy coupling (forecasting set) and total demand (forecasting set) in FIG. 3(A) and FIG. 3(C) are result sets of the actual forecast in present step, and the difference between the multi-energy coupling and the total demand is a calculation result (forecasting set) of the power grid load demand (subsequent calculation).

TABLE 6

Multi-energy coupling forecasting result and total demand forecasting result

| No. | Actual value (coupling self supply) | Forecasting value (coupling self supply) | Actual value (total demand) | Forecasting value (total demand) |
|---|---|---|---|---|
| 1 | 43.53 | 44.01408 | 1144.58 | 1157.58 |
| 2 | 23.02 | 23.62906 | 583.7 | 618.0737 |
| 3 | 20.87 | 21.49441 | 606.83 | 610.3525 |
| 4 | 68.93 | 69.64405 | 1458.72 | 1547.29 |
| 5 | 81.54 | 79.7132 | 1376.27 | 1357.008 |
| 6 | 42.79 | 44.34388 | 1182.28 | 1199.143 |
| 7 | 34.81 | 33.62083 | 885.21 | 765.9002 |
| 8 | 33.71 | 33.82143 | 864.45 | 927.1944 |
| 9 | 59.35 | 59.25783 | 1310.27 | 1312.341 |
| 10 | 74.12 | 76.71408 | 1501.11 | 1638.691 |
| 11 | 100.27 | 99.53899 | 1613.74 | 1533.311 |
| 12 | 52.79 | 53.38457 | 1235.36 | 1272.739 |
| 13 | 69.93 | 73.1467 | 1404.35 | 1469.58 |

Step 5, forecasting a net power load demand of the regional coupling power supply;

The net power load in step 5 is a difference between the total demand load and the regional coupling supply load.

The load demand forecast of the present invention refers to the calculation of the load demand of the regional power user on the power grid under the multi-energy coupling situation.

The net power load demand forecasting result of the regional coupling power supply obtained in step 4 is not the forecasting result of the regional demand on the power grid. The regional load demand on the power grid needs to be further calculated. The self supply of part of energy is realized in the multi-energy coupling mode, so that the regional load demand on the power grid is relatively reduced compared with the load demand without the multi-energy coupling mode. Therefore, the regional load demand should be the difference between the total power demand and the multi-energy coupling self supply. The calculation method of the energy demand based on this scene is shown in formula (25).

$$L_t = L_n - L_c \quad (25)$$

wherein $L_t$ is the load demand required to provide by the power grid, i.e. a deserved result of the forecasting model of the present invention, $L_n$ is the total demand of all loads, and $L_c$ is energy supply of a non-power-grid composition in the multi-energy coupling mode.

Figure 4:
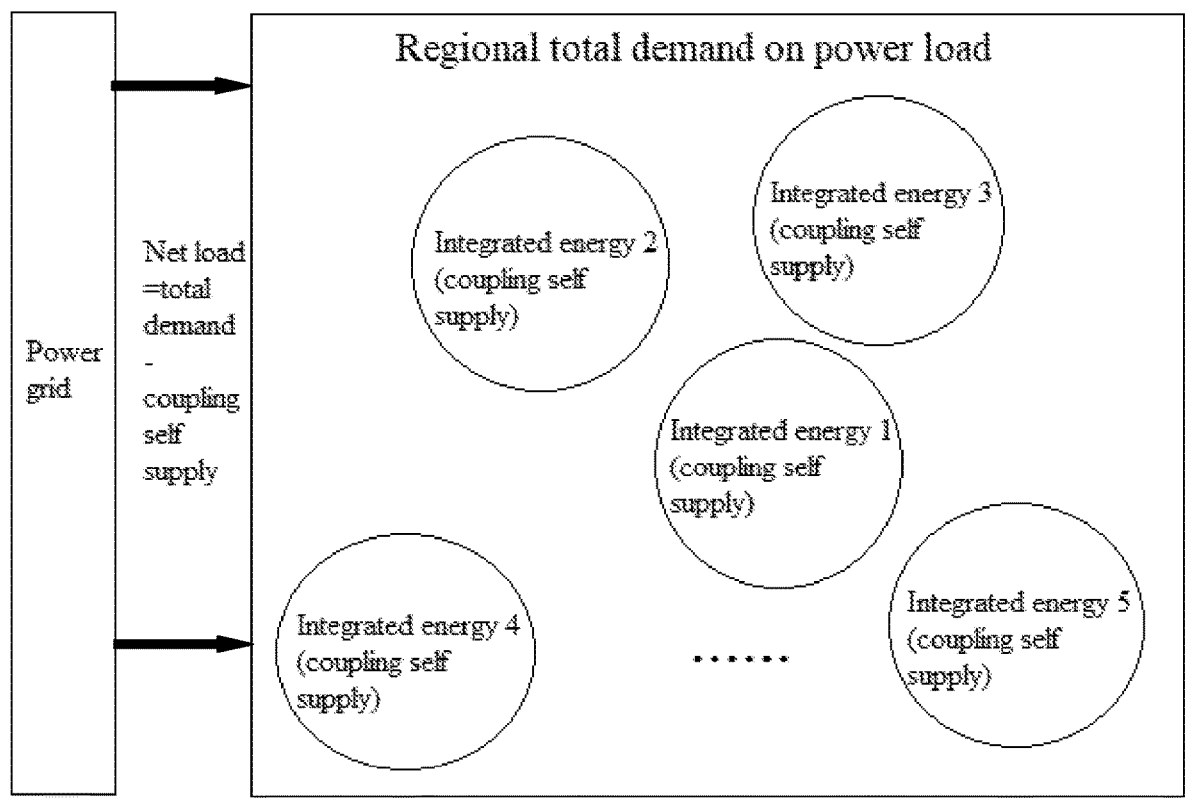
FIG. 4 is a diagram of load forecasting results of a power grid in district A of the present invention.

In present embodiment, FIG. 4 is a structural schematic diagram of the load demand in the multi-energy coupling mode. The regional energy supply is satisfied by the power grid and the multi-energy coupling self supply of integrated energy. In order to ensure the power supply, an accurate forecasting result of regional load demand on the power grid is needed. To solve this problem, the difference between the total load forecasting result and the multi-energy coupling supply forecasting result is used as the load forecasting result of the power grid.

The total demand forecasting result and the multi-energy coupling forecasting result are calculated according to the formula (25) to obtain the forecasting result of the regional power demand on the power grid in the multi-energy coupling circumstance. In present embodiment, the calculation result is shown in Table 7 and intuitively shown as the forecasting result (forecasting set) of the load demand on the power grid in FIGS. 3(A)-3(C).

TABLE 7

Forecasting result of regional power demand on power grid

| Sequence number | Actual value (coupling self-supply) | Forecasting value (coupling self-supply) | Actual value (total demand) | Forecasting value (total demand) | Actual value (demand of load users on the power grid) | Forecasting value (demand of load users on the power grid) |
|---|---|---|---|---|---|---|
| 1 | 43.53 | 44.01408 | 1144.58 | 1157.58 | 1101.05 | 1113.566 |
| 2 | 23.02 | 23.62906 | 583.7 | 618.0737 | 560.68 | 594.4447 |
| 3 | 20.87 | 21.49441 | 606.83 | 610.3525 | 585.96 | 588.8581 |
| 4 | 68.93 | 69.64405 | 1458.72 | 1547.29 | 1389.79 | 1477.646 |
| 5 | 81.54 | 79.7132 | 1376.27 | 1357.008 | 1294.73 | 1277.295 |
| 6 | 42.79 | 44.34388 | 1182.28 | 1199.143 | 1139.49 | 1154.799 |
| 7 | 34.81 | 33.62083 | 885.21 | 765.9002 | 850.4 | 732.2794 |
| 8 | 33.71 | 33.82143 | 864.45 | 927.1944 | 830.74 | 893.373 |
| 9 | 59.35 | 59.25783 | 1310.27 | 1312.341 | 1250.92 | 1253.083 |
| 10 | 74.12 | 76.71408 | 1501.11 | 1638.691 | 1426.99 | 1561.977 |
| 11 | 100.27 | 99.53899 | 1613.74 | 1533.311 | 1513.47 | 1433.772 |
| 12 | 52.79 | 53.38457 | 1235.36 | 1272.739 | 1182.57 | 1219.355 |
| 13 | 69.93 | 73.1467 | 1404.35 | 1469.58 | 1334.42 | 1396.434 |

To verify the advantages of the multi-energy forecasting model proposed in the present invention, results shown in Table 8 can be obtained by comparing the calculation efficiency of other load forecasting models.

TABLE 8

Model comparison evaluation

| | | t | MSE | RMSE | MAE | MAPE % | R^2 |
|---|---|---|---|---|---|---|---|
| Coupling | mRMR-AFWA-LSSVM | 21.31 | 2.05 | 1.431 | 1.10 | 2.08 | 0.9961 |
| | AFWA-LSSVM | 43.97 | 0.66 | 0.81 | 0.71 | 2.01 | 0.9976 |
| | LSSVM | 10.55 | 31.99 | 5.65 | 4.30 | 7.46 | 0.9395 |
| | AFWA-SVM | 27.60 | 12.6 | 3.55 | 3.41 | 7.07 | 0.9761 |
| | BP | 11.20 | 105.32 | 10.26 | 29.20 | 8.12 | 0.9237 |
| Total demand | mRMR-AFWA-LSSVM | 26.99 | 4545.26 | 67.41 | 52.33 | 4.56 | 0.9561 |
| | AFWA-LSSVM | 51.33 | 4455.12 | 66.74 | 51.79 | 4.51 | 0.9570 |
| | LSSVM | 8.94 | 5877.98 | 76.66 | 70.22 | 6.75 | 0.9432 |
| | AFWA-SVM | 33.59 | 7298.54 | 85.43 | 71.40 | 6.13 | 0.9295 |
| | BP | 12.30 | 130532.40 | 361.29 | 1033.31 | 7.01 | 0.9031 |

It can be discovered by analyzing the calculation results that the forecasting accuracy for the five indicators, i.e. MSE, RMSE, MAE, MAPE and R^2 are as follows:

AFWA-LSSVM>mRMR-AFWA-LSSVM>>LSSVM-AFWA-SVM>BP. In the coupling forecast, the MAPE difference is 0.07%, 5.39%, −0.90% and 1.03% respectively, and in the total demand forecast, the MAPE difference is 0.05%, 2.19%, 0.58% and 0.88% respectively. However, for the total calculation time, LSSVM<mRMR-AFWA-LSSVM<BP<AFWA-LSSVM<AFWA-SVM, and the total calculation time is 19.49, 23.5, 48.3, 61. 19 and 95.3 respectively.

After the mRMR selection, the AFWA-LSSVM forecasting accuracy decreases slightly, while the forecasting time is reduced. Since the indicators selected by examples of the present invention are indicators screened by experience, the accuracy of mRMR decreases slightly in this process. However, the mRMR can greatly reduce the data processing workload in the actual load forecasting process with a large indicator system and rich data and may not have great impact on the forecasting accuracy. Therefore, mRMR-AFWA-LSSVM is generally an optimum forecasting model of the actual load.

mRMR-AFWA-LSSVM has good forecasting accuracy and relatively high calculation performance. The present invention proposes the calculation method for forecasting the regional load demand on the power grid in the multi-energy coupling mode for the first time, which has significant reference value for power planning and economic and reliable operation of the power grid.

It shall be emphasized that the embodiments of the present invention are illustrative rather than restrictive. Therefore, the present invention includes, but is not limited to the embodiments described in the detailed description. Other implementation modes obtained by those skilled in the art according to the technical solution of the present invention also belong to the protection scope of the present invention.

We claim:

1. A load forecasting method based on a multi-energy coupling scene, comprising the following steps:

Step 1, establishing a multilevel indicator system of key influencing factors of load demand in a multi-energy coupling mode, and collecting corresponding data sets according to key influencing factors in the indicator system;

Step 2, extracting key influencing factors most correlated with a total load demand and a total supply of multi-energy coupling load in the indicator system established in step 1 respectively by using a maximum and minimum redundancy method, removing surplus influencing factors with redundancy information, and finally obtaining the key influencing factors influencing the total load demand and the total supply of the multi-energy coupling load;

Step 3, normalizing the data of the key influencing factors extracted in step 2, and initializing population characteristic parameters of an AFWA adaptive firework algorithm;

Step 4, based on the key influencing factor data normalized in step 3 and initialized population characteristic parameters of the AFWA adaptive firework algorithm, forecasting regional total power demand and regional coupling power supply respectively by using LSSVM optimized by AFWA algorithm; and Step 5, based on forecast results of the regional total power demand and the regional coupling power supply in step 4, forecasting a net power load demand of the regional coupling power supply.

2. The load forecasting method based on the multi-energy coupling scene according to claim 1, comprising the following steps:

the multilevel indicator system of the key influencing factors of the load demand in the multi-energy coupling mode in step 1 comprises factors influencing the regional total load demand and factors influencing the multi-energy coupling supply;

wherein the factors influencing the regional total load demand comprises economic development, industry structure and demand coupling benefit;

(1) economic development comprises: three-level influencing factor indicators of gross regional product and price index;

(2) industry structure comprises: three-level influencing factor indicators of contribution of regional primary industry, contribution of regional secondary industry, contribution of regional tertiary industry;

(3) demand coupling benefit comprises three-level influencing factor indicators of investment in energy-saving systems;

wherein the factors influencing the multi-energy coupling supply comprise: renewable energy power supply, combined supply of cooling, heating and electricity, other energy power supply and energy supply economy;

(1) the renewable energy power supply comprises: three-level influencing factor indicators of wind power generating capacity, solar power capacity, hydroelectric power generating capacity and other renewable energy power generating capacity;

(2) the combined supply of cooling, heating and electricity comprises: three-level influencing factor indicators of combined supply power;

(3) other energy power supply comprises: three-level influencing factor indicators of garbage power generating capacity;

(4) energy supply economy comprises: three-level influencing factor indicators of unit price of main energy and investment in energy base stations.

3. The load forecasting method based on the multi-energy coupling scene according to claim 1, wherein the step 2 specifically comprises:

(1) obtaining correlation between each influencing factor and load value by calculating mutual information of each influencing factor:

$$I(x_i, y) = \int\int p(x_i, y)\log\frac{p(x_i, y)}{p(x_i)p(y)}dx_i dy \quad (1)$$

wherein $I(x_i, y)$ is positive correlation between $x_i$ and y, $x_i$ is the $i^{th}$ influencing factor, y is the load value, $p(x_i, y)$, $p(x_i)$ and $p(y)$ represent combined probability density of $x_i$ and y, probability density of $x_i$ and probability density of y;

(2) by calculating the maximum correlation of each influencing factor, selecting a set of m key influencing factors with maximum correlation with the load value:

$$\max D(S, y), \quad (2)$$
$$D = \frac{1}{|S|}\sum_{x_i \in S} I(x_i, y),$$

wherein S is the set of the influencing factors $\{x_i\}$, $|S|=m$ is the number of key influencing factors to be selected, and D is a calculation result of the correlation between the selected m influencing factors and the load value;

(3) by calculating minimum redundancy of each influencing factor, selecting the set of m key influencing factors with minimum information redundancy with the influencing factors:

$$\min R(S), \quad (3)$$
$$R = \frac{1}{|S|^2}\sum_{x_i, x_j \in S} I(x_i, x_j),$$

wherein R is a calculation result of mutual redundancy of the selected m influencing factors;

(4) based on mRMR criterion, determining key influencing factors by adopting a gain search method, wherein assuming that m−1 characteristic influencing factors exist in S, the selection basis of the m characteristic influencing factor is shown in formula (5):

$$\max_{x_j \in X-S_{m-1}}\left[I(x_i, y) - \frac{1}{m-1}\sum_{x_i \in S_{m-1}} I(x_j, x_i)\right] \quad (4)$$

the mRMR criterion is as follows:

$$\max \phi(D,R), \phi=D-R \quad (5)$$

(5) obtaining the score φ of each key influencing factor through formulas (1)-(5), and further selecting top m key influencing factors.

4. The load forecasting method based on the multi-energy coupling scene according to claim 1, wherein the step 3 specifically comprises:

(1) normalizing the original data, and converting a preprocessed data set of the original data into dimensionless data from 0 to 1; and selecting part of the data as a training set for subsequent AFWA-LSSVM model training;

the min-max standardization method is recommended as the data normalization method in the present invention, and the calculation formula is shown in formula (6):

$$x^* = \frac{x - x_{min}}{x_{max} - x_{min}} \quad (6)$$

wherein x* is a data normalization result, x is an actual value of the data set, $x_{min}$ is a minimum value in the data set, and $x_{max}$ is a maximum value in the data set;

(2) initializing population characteristic parameters of the AFWA adaptive firework algorithm, comprising a firework position, a population size, number of fireworks, total number of sparks, upper and lower boundaries of sparks, explosion range, data dimension, function evaluation times and iteration times.

5. The load forecasting method based on the multi-energy coupling scene according to claim 1, wherein the step 4 specifically comprises:

(1) first, using the AFWA algorithm to optimize penalty parameters and kernel function width parameters of the LSSVW algorithm;

(2) then inputting key influencing factor load data after the redundancy processing in step 2 to perform the AFWA-LSSVM model training;

(3) after completing the process of optimizing the LSSVM model training by using AFWA, inputting the key influencing factor data set at a to-be-forecast time point, and calculating final load forecast results of total load demand and multi-energy coupling supply respectively.

6. The load forecasting method based on the multi-energy coupling scene according to claim 5, wherein the step 4 (1) specifically comprises:

①  the calculation formula for minimizing the calculation error through firework algorithm optimization is as follows:

$$\min f(X) \quad (7)$$
$$\text{s.t.} \quad g_t(X) \leq 0 \ (t=1, 2, \cdots, m)$$

wherein $f(X)$ is a target function and is set as that an error between the LSSVM forecast value and the actual value is minimum; $g_t(X)$ is a constraint function, m is number of the constraint functions, and X is an n-dimensional optimization variable;

② initializing the data:

$$x_{ij}(0) = x_{ij}^L + \text{rand}(0,1)(x_{ij}^U - x_{ij}^L) \quad (8)$$

wherein $x_{ij}(0)$ is spatial positions of initial firework individuals, i.e., initialized penalty parameters and kernel function width parameters of LSSVM; $x_{ij}^U$ and $x_{ij}^L$ are upper boundary and lower boundary of $j^{th}$ dimension respectively, i.e., parameter boundaries; rand (0,1) represents random numbers i=1, 2, . . . , N and j=1, 2, . . . ,n generated in an azimuth greater than 0 and less than 1;

③ calculating an explosion operator, wherein the explosion operator mainly comprises explosion intensity, explosion range and displacement variation, wherein the explosion intensity is represented by the number of sparks, and the calculation way is as follows:

$$N_i = \hat{N} \cdot \frac{Y_{max} - f(X_i) + \varepsilon}{\sum_{i=1}^{N}(Y_{max} - f(X_i)) + \varepsilon} \quad (9)$$

wherein $N_t$ is number of sparks of $i^{th}$ firework and is a set value; $\hat{N}$ is a constant of controlling the total number of the sparks; $Y_{max} = \max(f(X_t))$ is an adaption value of the individual with the worst adaptability and individual with the greatest error of the load forecast result; $f(X_t)$ is an adaption value of individual $X_t$, i.e. load forecast result, and $\varepsilon$ is an extremely small constant for preventing denominator from being zero;

meanwhile, to limit the number of the sparks, the following rules are set:

$$N_i = \begin{cases} \text{round}(N_{min}), & N_i < N_{min} \\ \text{round}(N_{max}), & N_i > N_{max} \\ \text{round}(N_i), & \text{Others} \end{cases} \quad (10)$$

wherein round( ) is a rounding function;

$$A_i = \hat{A} \cdot \frac{f(X_i) - Y_{min} + \varepsilon}{\sum_{i=1}^{N}(f(X_i) - Y_{min}) + \varepsilon} \quad (11)$$

wherein $A_t$ an explosion range of the $i^{th}$ firework, $\hat{A}$ is the constant of limiting the maximum explosion range, and $Y_{min} = \min(f(X_t))$ is the adaption value of the firework individual with the highest forecast accuracy;

an explosion radius is a distance between a specific individual and an optimum individual:

$$\hat{s} = \arg \min_{s_i}(d(s_i, s^*)) \quad (12)$$

$$f(s_i) > f(X) \quad (13)$$

wherein d indicates the calculation of some distance, i.e. the distance between various sparks, and each spark represents the width parameter in the LSSVM function and the kernel function; $s_i$ indicates all sparks, s* indicates the individuals with best adaptability in all sparks and fireworks, and X indicates the fireworks;

formula (12) and formula (13) indicate that the explosion radius is the distance satisfying two conditions: condition 1: selecting the distance as the shortest distance from the alternative individual to the optimum individual; condition 2: alternative individuals are individuals having worse adaptability than the fireworks of this generation; and then carrying out displacement operation for the fireworks from different dimensions:

$$\Delta x_{ij} = x_{ij} + \text{rand}(0, A_i) \quad (14)$$

④ Variation operator:

$$x_{ij} = x_{ij} g \quad (15)$$

wherein g~N(1,1) is Gaussian distribution with both mean and variance of 1;

⑤ mapping rule:

Mapping the sparks beyond the boundary to a limit range by using a modular arithmetic rule:

$$x_{ij} = x_{ij}^L + |x_{ij}^L| \% (x_{ij}^U - x_{ij}^L) \quad (16)$$

wherein % represents modular arithmetic, $x_{ij}$ represents the position of $i^{th}$ individual on $j_{th}$ dimension, and $x_{ij}^U$, $x_{ij}^L$ indicate the upper boundary and lower boundary on the $j_{th}$ dimension respectively, ⑥ selection operation:

calculating and selecting the distance between two individuals by using Euclidean distance:

$$R(X_i) = \sum_{q=1}^{K} d(X_i, X_q) = \sum_{q=1}^{K} \|X_i - X_q\| \tag{17}$$

wherein $R(X_i)$, indicates the sum of the distance from $X_i$ to all other individuals, $d(X_i,X_q)$ indicates the Euclidean distance between any two individuals $X_i$, $X_q$, and K are position sets of all sparks after the Gaussian compilation, $q \in K$;

$$p(X_i) = \frac{R(X_i)}{\sum_{q \in K} R(X_i)} \tag{18}$$

wherein $p(X_i)$ indicates the selection probability of $X_i$; and the fireworks or sparks $X_i$ selected after reaching the maximum iteration times is the optimum penalty parameter and width parameter factor vector.

7. The load forecasting method based on the multi-energy coupling scene according to claim 5, wherein the step 4 (2) specifically comprises:

① after the nonlinear mapping, the obtained final decision function is as follows:

$$f(x) = w^T \cdot \varphi(x) + b \tag{19}$$

wherein $w \in R^k (k>d)$ is a high-dimensional characteristic weight vector and reflects how each key influencing factor affects the load size and the influencing degree of each key influencing factor on the load value; $x_i \in R^d$ is the input of d-dimensional training samples and is specifically the sample of each key influencing factor; $y_i \in R$ is the output of training samples and the load value corresponding to the corresponding key influencing factor; and $b \in R$ is an offset;

② according to the minimization principle of the structural risk, the forecast error is minimized to find the optimum high-dimensional characteristic weight vector w and the offset b; and the optimization problem is obtained as follows:

$$\min \frac{1}{2} w^T w + r \sum_{i=1}^{n} \xi_i^2 \tag{20}$$

wherein $r>0$ is penalty parameter, and $\xi_i$ is a slack variable;

③ compared with a standard support vector machine algorithm, differences exist in constraint conditions:

$$y_i[w^T \cdot \varphi(x_i)+b]=1-\xi_i, i=1,2,\ldots,n \tag{21}$$

④ Solving the optimization problem by using Lagrangian function:

$$L = \frac{1}{2} w^T \cdot w + r \cdot \frac{1}{2} \sum_{i=1}^{n} \xi_i^2 - \sum_{i=1}^{n} \alpha_i \{y_i[w^T \cdot \varphi(x_i) + b] - 1 + \xi_i\} \tag{22}$$

s.t. $\begin{cases} w = \sum_{i=1}^{n} \alpha_i y_i \varphi(x_i) \\ \sum_{i=1}^{n} \alpha_i y_i = 0 \\ \alpha_i = r\xi_i \\ y_i[w^T \cdot \varphi(x_i) + b] - 1 + \xi_i = 0 \end{cases}$ wherein $\alpha_i$ is a Lagrangian multiplicator vector, and $\alpha_i > 0$, i=1, 2, ..., n;

⑤ Obtaining the final forecasting function as shown in formula (23):

$$f(x) = \sum_{i=1}^{n} \alpha_i K(x, x_i) + b \tag{23}$$

wherein $K(x_i, x_j) = \varphi(x_i)^T \varphi(x_j)$ is a kernel function satisfying Mercer conditions:

a radial basis kernel function is used as the kernel function, as shown in formula (24):

$$K(x, x_i) = \exp\left(-\frac{\|x - x_i\|^2}{2g^2}\right) \tag{24}$$

wherein g is a width factor of the kernel function.

8. The load forecasting method based on the multi-energy coupling scene according to claim 5, wherein the step 4 (3) specifically comprises:

① inputting the data sets of total load key influencing factors at a required forecasting time period into the AFWA-LSSVM model completing the total load data training, and then running the algorithm to obtain the forecasting result of the total load, ② inputting the data sets of multi-energy coupling key influencing factors at a required forecasting time period into the AFWA-LSSVM model completing the multi-energy coupling data training, and then running the algorithm to obtain the forecasting result of the multi-energy coupling.

9. The load forecasting method based on the multi-energy coupling scene according to claim 1, wherein the step 5 specifically comprises:

the net power load in step 5 is a difference between the total demand load and the regional coupling supply load, and the calculation method of the energy demand based on this scene is shown in formula (25):

$$L_t = L_n - L_c \tag{25}$$

wherein $L_t$ is the load demand to be provided by the power grid, i.e. the net power load demand of the regional coupling power supply, $L_n$ is the total demand of all loads, and $L_c$ is energy supply of a non-power-grid composition in the multi-energy coupling mode.

* * * * *